United States Patent
Lee et al.

(10) Patent No.: US 10,812,205 B1
(45) Date of Patent: Oct. 20, 2020

(54) ANTENNA PERFORMANCE EVALUATION METHOD

(71) Applicant: NATIONAL CHIAO TUNG UNIVERSITY, Hsinchu (TW)

(72) Inventors: Ta-Sung Lee, Hsinchu (TW); Chia-Hung Lin, Tainan (TW); Yu-Chien Lin, New Taipei (TW); Yi-Wei Chen, Hsinchu (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 0 days.

(21) Appl. No.: 16/731,760

(22) Filed: Dec. 31, 2019

(30) Foreign Application Priority Data

Dec. 4, 2019 (TW) .............................. 108144343 A

(51) Int. Cl.
*H04B 17/336* (2015.01)
*H04B 17/391* (2015.01)
*H04B 7/0413* (2017.01)

(52) U.S. Cl.
CPC ......... *H04B 17/336* (2015.01); *H04B 7/0413* (2013.01); *H04B 17/3912* (2015.01)

(58) Field of Classification Search
CPC .................................................. H04B 17/336
See application file for complete search history.

(56) References Cited

U.S. PATENT DOCUMENTS

| | | | | |
|---|---|---|---|---|
| 2004/0259555 | A1* | 12/2004 | Rappaport | H04W 16/18 455/446 |
| 2005/0113116 | A1* | 5/2005 | Avidor | H04W 72/1252 455/456.5 |
| 2010/0188997 | A1* | 7/2010 | Aoyama | H04W 16/22 370/252 |
| 2017/0012714 | A1* | 1/2017 | Kildal | G01R 29/0821 |
| 2020/0044329 | A1* | 2/2020 | Wu | H01Q 1/48 |

* cited by examiner

Primary Examiner — Hsinchun Liao
(74) Attorney, Agent, or Firm — Rabin & Berdo, P.C.

(57) ABSTRACT

An antenna performance evaluation method is disclosed. The method includes the following steps: measuring plurality of throughput values of the to-be-tested antenna at the first angle under different average radiation signal-to-interference ratio (SIR). The average radiation SIR and throughput values are fitted to output the first fitted curve. The second throughput value is measured at a certain average radiation SIR of the second angle of the to-be-tested antenna. Calculating a difference value between the first throughput value and the second throughput value corresponding to the same average radiation SIR, and the difference value and the first fitting curve constitute the transition second fitting curve. Selecting different average radiation SIR is repeatedly, and measure the corresponding second throughput value, and the corresponding difference value is calculated to update the transition second fitting curve. When the difference value is lower than the preset error range, the final second fitting curve is outputted.

7 Claims, 5 Drawing Sheets

ANTENNA PERFORMANCE EVALUATION METHOD

FIELD

The present disclosure relates to an antenna performance evaluation method, particularly to an antenna performance evaluation method implemented on a cellular telephone.

BACKGROUND

In a method for evaluating the performance of a cellular telephone antenna, the evaluation is completed by using multi-input multi-output (MIMO) average radiated signal-to-interference ratio (SIR) sensitivity (MIMO average radiated SIR sensitivity is abbreviated as MARSS below). MARSS is an important indicator defined by Cellular Telecommunications & Internet Association (CTIA) to evaluate the MIMO system receiving performance. By adjusting the SIR, as well as observing the performance of package and capture under different SIR condition, the communication quality performance would be determined.

The traditional evaluation method needs to measure throughput values at different average radiated SIRs for a to-be-tested antenna at different angles. Such evaluation method requires measuring intact throughput value curves of every test angle, in which it takes lots of time.

SUMMARY

In view of the aforementioned problem, an antenna performance evaluation method is provided. This method is used in MARSS test to largely decrease measuring time. The method comprises the following steps. A plurality of first throughput values of a to-be-tested antenna at a first angle are measured, and each of the first throughput values respectively has a different corresponding average radiated SIR. The plurality of throughput values are fitted to the corresponding average radiated SIRs to generate a first fitting curve of the to-be-tested antenna at a first angle. The average radiation SIR of the to-be-tested antenna is chosen at a second angle, and a corresponding second throughput value of the antenna at the second angle is measured. A difference value between the second throughput value and the chosen first throughput values is calculated, and the first fitting curve and the difference value constitute a transition second fitting curve. Another different average radiated SIR at the second angle is repeatedly chosen to measure the corresponding second throughput value. Then, the corresponding difference value is calculated to update the transition second fitting curve. A final second fitting curve is obtained when the difference value is below a predefined inaccuracy range.

In one embodiment, the antenna performance evaluation method further comprises an error-preventing mechanism, thus the difference value is decreased each time after the corresponding second throughput value is measured at the second angle.

In another embodiment, the first fitting curve, the transition second fitting curve and the final fitting curve are linear or non-linear functions.

In still another embodiment, the non-linear function is a cubic polynomial function.

In yet still another embodiment, the second angle is an arbitrary angle relative to the first angle.

In yet still another embodiment, the range of the first throughput values corresponding to the final second fitting curve is smaller than the range of the second throughput values corresponding to the first fitting curve.

In yet still another embodiment, the antenna performance evaluation method is applied on a MIMO system. The MIMO system comprises a simulator, a power amplifier and a dark room. The simulator outputs test signals of the average radiated SIR test. The power amplifier receives and amplifies test signals. The dark room comprises a plurality of the amplified test signals received by the measuring antenna, and outputs multipath signals. The to-be-tested antenna receives the multipath signals, and generates confirmed signals in response to the simulator, which generates the corresponding throughput values.

According to the above description, comparing to the prior art, the disclosed antenna performance evaluation method provides following advantages:

(1) The disclosure only requires completely measuring the average radiated SIRs and the throughput values of the to-be-tested antenna at a certain angle to generate a fitting curve. By the obtained fitting curve, the fitting curve of the average radiated SIRs and the throughput values could be generated with only a small amount of data. Thus, time required is largely shortened.

(2) In the disclosure, there's no need to use a large amount of data to train the deep neural network, and the calculation method is simple as well as effective.

DETAILED DESCRIPTION

For better acquaintance of the disclosed techniques, details, advantages and effects, the evaluation committee of United States Patent and Trademark Office will be provided with embodiments referring to the accompanying drawings, wherein the figures may not be the actual proportion and precise configuration after implementation, but only for the purpose of illustration and supplementary descriptions. Therefore, the attached drawings should not be interpreted by the proportion and configuration, and the following claims should not be limited.

The disclosed antenna performance evaluation method may be implemented on antenna products of various industries, such as antennas of mobile phones, consumer electronics and communication test sets. Antenna performance evaluation test requires implementation of multi-input multi-output (MIMO) average radiated signal-to-interference ratio (SIR) sensitivity (MIMO average radiated SIR sensitivity is abbreviated as MARSS below).

Figure 1:
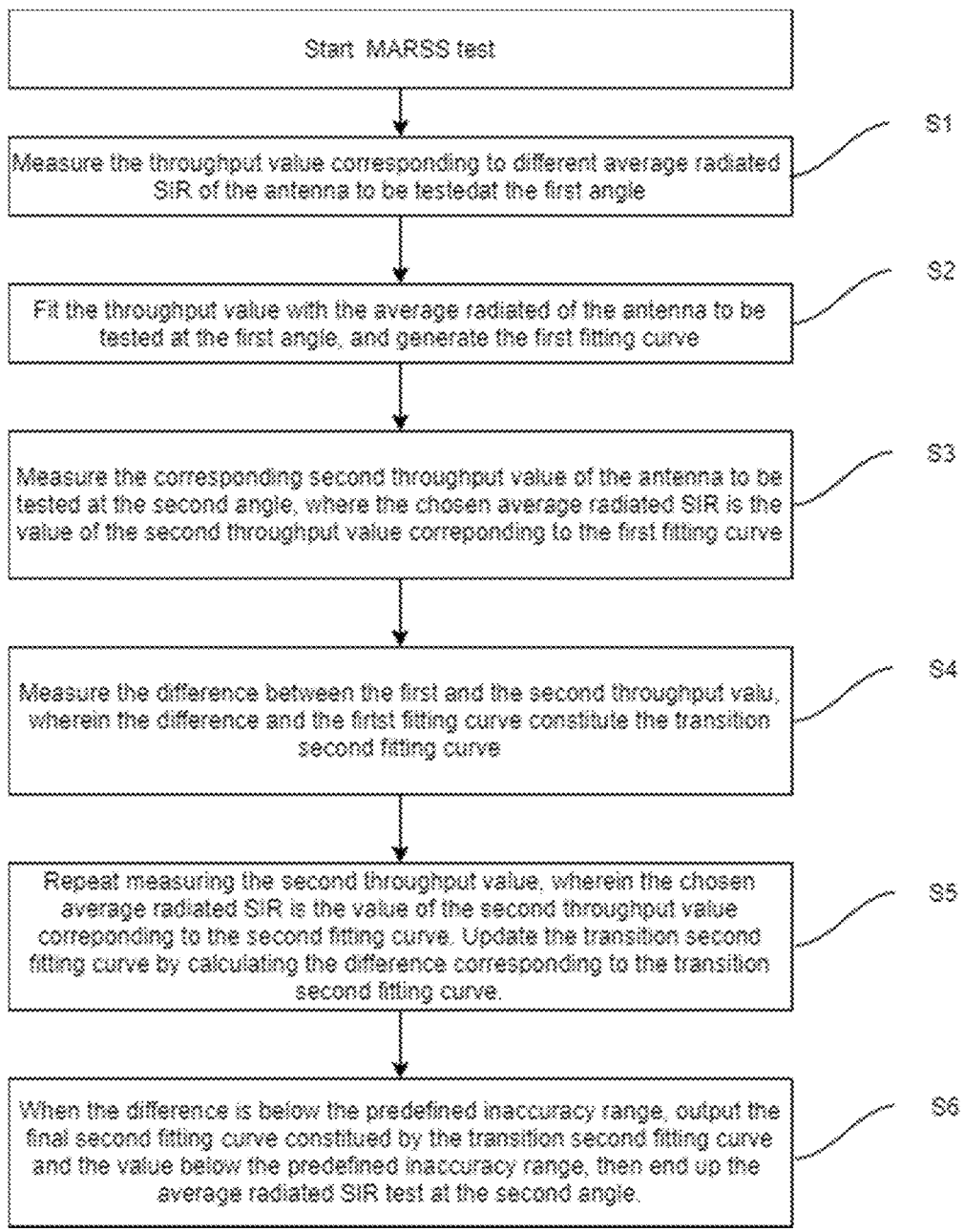
FIG. 1 is a flow chart of an antenna performance evaluation method according to an embodiment of this invention.

Referring to FIG. 1, which is a flow chart of an antenna performance evaluation method according to an embodiment of this invention. In FIG. 1, the antenna performance evaluation method comprises the following steps (S1-S6). Please also referring to FIG. 2A-2F, which are fitting curves obtained in each step of an antenna performance evaluation method according to an embodiment of this invention.

Figure 2A:
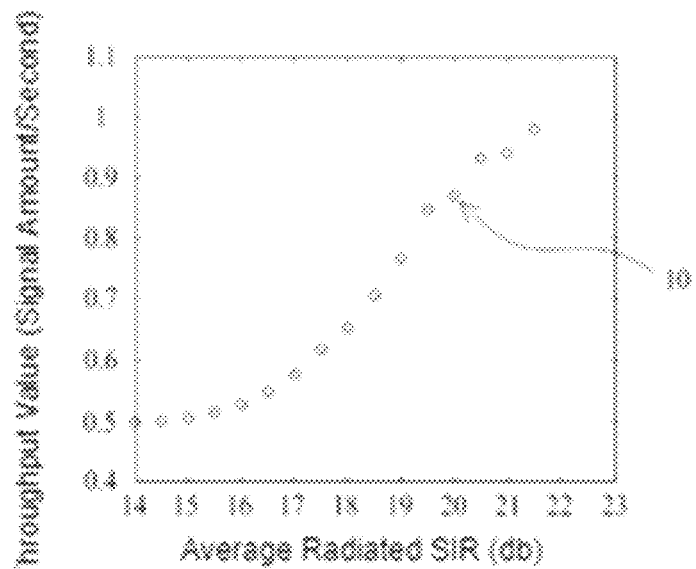
FIGS. 2A-2F are fitting curves obtained in each step of an antenna performance evaluation method according to an embodiment of this invention.

Step S1: step S1 of FIG. 1 and FIG. 2A show a plurality of first throughput values 10 of a to-be-tested antenna at a first angle, such as 0 degree angle. A way to measure the first throughput values 10 is firstly choosing an average radiated SIR value and then generating a corresponding throughput value after the chosen value is tested by MARSS.

The throughput values mentioned above represent one of the basic characteristics of an antenna of a to-be-tested device, which refers to data transferred amount in unit time (unit: bits/second). The throughput values aren't fixed values, but relate to the chosen average radiated SIR and the angle at which the antenna is measured. SIR refers to a ratio of the required signal intensity to the background signal intensity. A throughput value is generally expressed as a ratio of a measured throughput value to the maximum throughput value of the tested antenna, which is expressed by percentage.

Figure 2B:
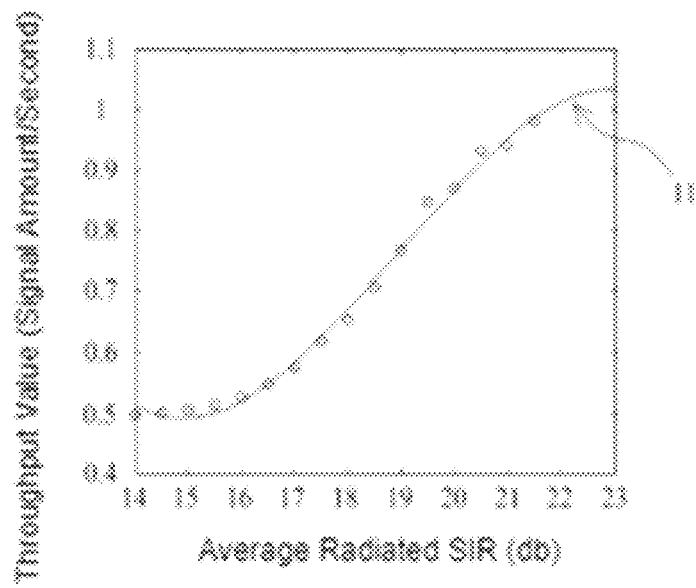

Step S2: as shown in step S2 of FIG. 1 and FIG. 2B, the plurality of the measured first throughput values 10 and the corresponding average radiated SIR are fitted to obtain a first fitting curve 11 of the antenna of the to-be-tested device at the first angle. The function of the first fitting curve 11 represents the relation between the average radiated SIRs and the first throughput values 10 of the antenna of the to-be-tested device at the first angle.

According to an embodiment, a way to fit the first throughput values 10 with the corresponding average radiated SIRs could be achieved through using L2 Norm method to measure fitting effects by correlation evaluation index or making appropriate correction according to the hardware characteristics of the to-be-tested device.

Figure 2C:
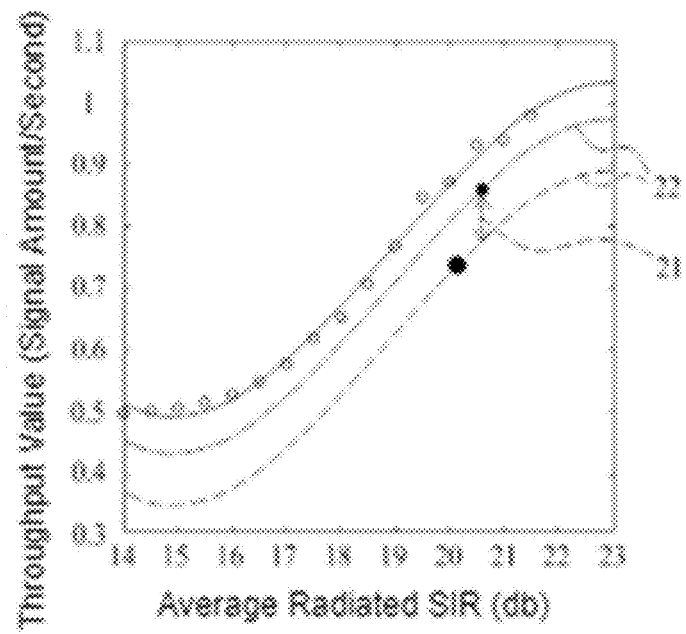

Step S3: as shown in step S3 of FIG. 1 and FIG. 2C, an average radiated SIR of the antenna of the to-be-tested device at a chosen second angle is chosen, and a corresponding second throughput value 20 is measured. Since the relation between average radiated SIRs and throughput values are not exactly the same at different angles, it's impossible to directly calculate throughput values corresponding to any average radiated SIR by the first fitting curve 11 mentioned above.

Figure 2D:
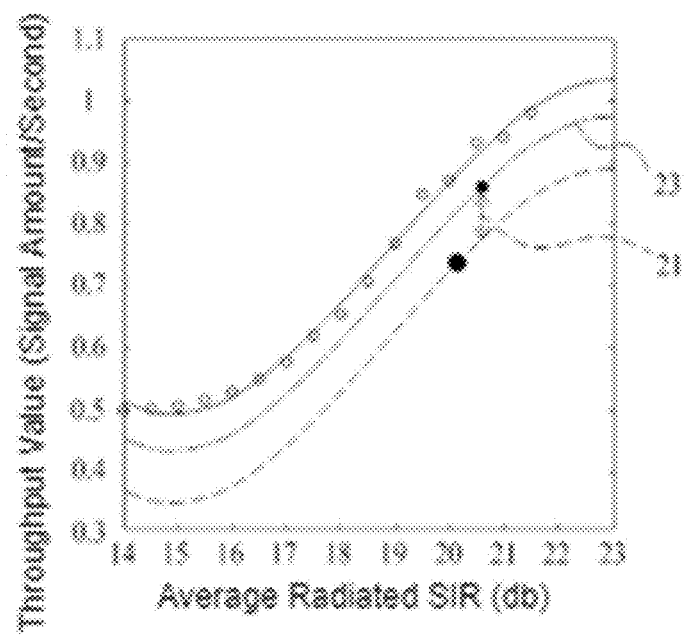

Step S4: as shown in step S4 in FIG. 1 and FIG. 2D, a difference value 21 between the second throughput value 20 and the first throughput value 10 corresponding to the first fitting curve 11 is calculated. The second throughput value 20 and the corresponding first throughput value 10 are under the same average radiated SIR. A transition second fitting curve 22 may be generated by combining the difference value 21 and the first fitting curve 11.

According to the step S3 above, though it's impossible to directly calculate the second throughput value 20 of the to-be-tested antenna at the second angle by the first fitting curve 11, it's practicable to assume that a same throughput value would be measured by choosing the same average radiated SIR at different angles. The difference between the assumed throughput value and the actually-measured throughput value is the difference value 21 calculated in step S4. Thus, after correcting the first fitting curve 11 by the difference value 21, the transition second fitting curve 22 mentioned above would be generated.

Figure 2E:
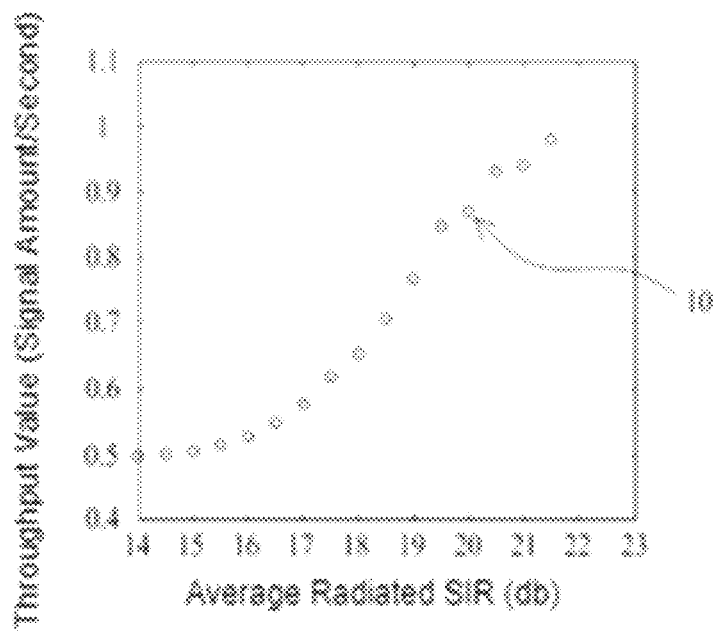

Step S5: as shown in step S5 of FIG. 1 and FIG. 2E, the step S3 and S4 are repeated by choosing a different average radiated SIR at the second angle and measuring the corresponding second throughput value 20. Then, such as in the step S4, the difference value 21 is calculated from the second throughput value 20 and the first fitting curve 11, and the difference value 21 between the second throughput value 20 and the transition second fitting curve 22 is further calculated. By doing so, every time after calculating the second throughput value 20, the second transition fitting curve 22 would be updated.

Figure 2F:
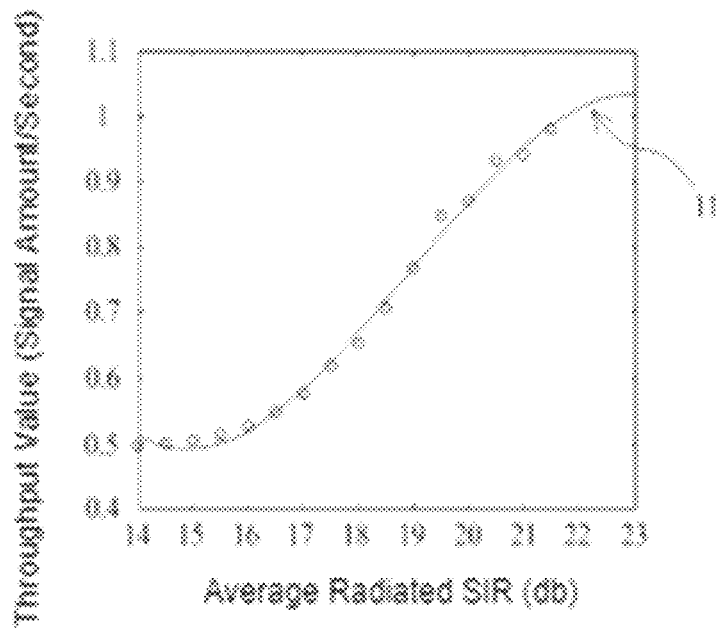
Figure 3:
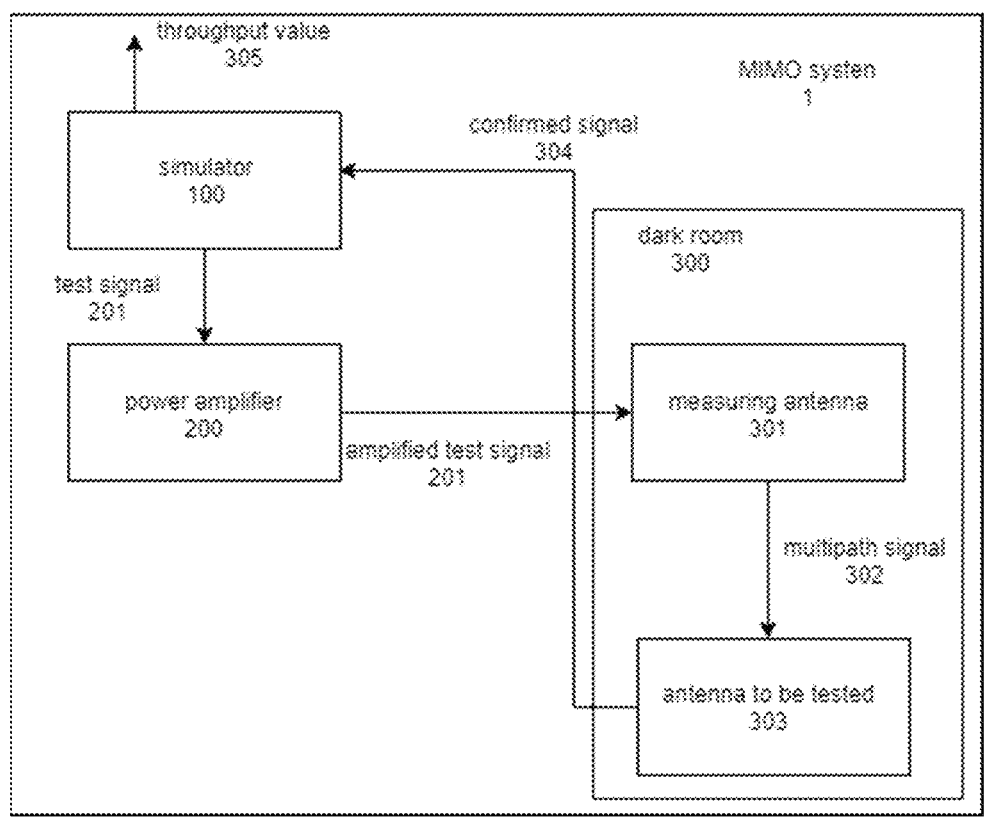
FIG. 3 is a diagram showing a MIMO system of an antenna performance evaluation method according to an embodiment of this invention.

Step S6: as shown in step S6 in FIG. 1 and FIG. 2F, when the calculated difference value 21 is below an error range, a final second fitting curve 23 is generated, and further end up the antenna performance evaluation method of the to-be-tested antenna at the second angle. As mentioned above, which means that the transition second fitting curve 22 is pretty closed to the action of the to-be-tested antenna at the second angle. The relation between the second throughput value 20 and the average radiated SIR at the second angle may be expressed by the second transition fitting curve 22.

According to another embodiment of the disclosure, when repeating the Step S3 and S4, an error preventive mechanism is needed, thus the every calculated difference 21 would be smaller, or the antenna performance evaluation method would diverge, and the final second fitting curve 23 would not be generated. For example, the error preventive mechanism could be, the difference of every selected average radiated SIR is larger than a predetermined value, or the selected average radiated SIR is in increasing order, or such limitation.

According to another embodiment of the disclosure, the first fitting curve 11, the transition second fitting curve 22 and the final second fitting curve 23 could be represented by any linear or non-linear functions.

According to another embodiment of the disclosure, the non-linear function, representing the relationship between the average radiated SIR and the throughput value, could be a cubic polynomial function.

According to another embodiment of the disclosure, the second angle of the antenna of the to-be-tested device could be any angle relative to the first angle. Therefore, it could be understood that the antenna performance evaluation method of the disclosure only needs to conduct a complete MARSS test at the first angle. After obtaining the first fitting curve 11, it could be used to calculate the fitting curve of any angle, which could greatly reduce the testing time.

According to another embodiment of the disclosure, the antenna performance evaluation method of the disclosure could only fit the second throughput value 20 in a smaller range when applied to the second angle. For example, most mobile phones antennas are operated between 70% and 90% of the maximum throughput value, and this behavior is a linear function. Therefore, only the throughput value in this range could be selectively fitted.

According to another embodiment of the disclosure, the antenna performance evaluation method of the disclosure is implemented by using a MIMO system 1, which comprises a simulator 100, a power amplifier 200 and a dark room 300. The simulator 100 outputs test signals 101 of average radiated SIR. The power amplifier 200 receives and outputs amplified test signals 201 as mentioned above. The dark room 300 comprises a plurality of measuring antennas 301 which receive the amplified test signals 201, and outputs a multipath signal 302 to a to-be-tested antenna 303 in the dark room 300. The to-be-tested antenna 303 receives the multipath signal 302, and then generates a confirmed signal 304 in response to the simulator 100, which further generates a corresponding throughput value 305, and ends up the average radiated test.

The above is only illustrative, not restrictive. Any equivalent modification or alteration of the disclosure that is not outside the spirit and scope of the disclosure shall be included in the scope of the claim attached hereto.

What is claimed is:

1. An antenna performance evaluation method which is used in multi-input multi-output (MIMO) average radiated signal-to-interference ratio (SIR) sensitivity, comprising:
measuring a plurality of first throughput values of a to-be-tested antenna at a first angle, wherein each of the plurality of the first throughput values respectively corresponds to an average radiated SIR;
fitting the plurality of the first throughput values with the corresponding average radiated SIR to output a first fitting curve corresponding to the antenna at the first angle;
choosing an average radiation SIR of the antenna at a second angle;
measuring a corresponding second throughput value of the antenna at the second angle;
choosing one of the first throughput values having an average radiated SIR that is the same as the average radiated SIR chosen at the second angle;
calculating a difference value between the second throughput value and the chosen first throughput values, wherein the first fitting curve and the difference value constitute a transition second fitting curve;
repeatedly choosing another different average radiated SIR at the second angle, measuring the corresponding second throughput value, and calculating the corresponding difference value to update the transition second fitting curve; and
obtaining a final second fitting curve when the difference value is below a predefined inaccuracy range.

2. The antenna performance evaluation method of claim 1, further comprising an error-preventing mechanism, thus the calculated difference value is decreased each time after the corresponding second throughput value is measured at the second angle.

3. The antenna performance evaluation method of claim 2, wherein the first fitting curve, the transition second fitting curve and the final fitting curve comprises a linear or a non-linear function.

4. The antenna performance evaluation method of claim 3, wherein the non-linear function comprises a cubic polynomial function.

5. The antenna performance evaluation method of claim 2, wherein the second angle is an arbitrary angle relative to the first angle.

6. The antenna performance evaluation method of claim 2, wherein the range of the second throughput value corresponding to the final second fitting curve is smaller than the range of the first throughput value corresponding to the first fitting curve.

7. The antenna performance evaluation method of claim 1, wherein the MIMO system comprises:
a simulator outputting a test signal of the average radiated SIR test;
a power amplifier receiving and amplifying the test signal; and
a dark room comprising a plurality of measuring antennas, wherein the plurality of the measuring antennas receive and amplify the test signal and output a multipath signal to be received by the to-be-tested antenna, which generates a confirmed signal in response to the simulator generating a corresponding throughput value.

* * * * *